Patented Oct. 6, 1931

1,826,183

UNITED STATES PATENT OFFICE

HANS LEHRECKE, OF FRANKFORT-ON-THE-MAIN, GERMANY, ASSIGNOR TO AMERICAN LURGI CORPORATION, OF NEW YORK, N. Y., A CORPORATION OF NEW YORK

PROCESS OF TREATING METALLURGICAL SLIMES

No Drawing. Application filed June 18, 1930, Serial No. 462,149, and in Germany June 28, 1929.

This invention relates to a process of treating metallurgical slimes.

In the treatment of ores, such as sulphidic, phosphatic, oxidic, or like ores, by flotation or by ordinary levigation, extremely fine slimes are occasionally obtained which must be sintered prior to further treatment. The dehydration and sintering of such slimes is known to be attended with considerable difficulty, owing, in particular, to their fine state of division.

Processes are already known, which aim at avoiding or lessening these difficulties. Thus, for example, a process for dehydrating these slimes by mechanical means, has been proposed in which the dehydration is effected by placing the wet slimes on a jig screen covered with granular material of the same kind. The jigging movement of the dehydrating surfaces and the suction set up by the water draining away from the filtering layer, is intended to effect the destruction of the foam and consequently bring about an extensive dehydration of the slime.

Moreover, a process has been proposed in which the difficulties arising, in the sintering process, from the fine character of the slimes are intended to be overcome by drying the drained slimes to a low moisture content, then mixing them with about the same amount of agglomerate of the same material, and blowing the mixture on a Dwight-Lloyd apparatus. The agglomerate serves as a loosening support for the slimes, and facilitates the passage of the blast air through the charge.

Accordingly, in preparing metallurgical slimes for blast roasting, it has hitherto been the practice to drain and dry same by a separate process, then to mix them, in another process with a coarse-grained loosening material, and then to subject them to blast roasting. Consequently, the draining of the slimes on the one hand, and their preparation for blast roasting on the other, have hitherto always been special and distinct operations.

The present invention however contemplates a process which combines the draining of the slimes and their preparation for blast roasting, so that, after being drained, they can be blown at once, without drying. The process is based on incorporating with the slimes—for the purpose of draining same—solid or lump fuels, such as coke or the like, which facilitate the drainage of water, the mixing being effected during the preparation, and either prior to or during the draining treatment, which is performed, for example, by filtration, centrifuging or the like. The fuel acts like a filter, intersecting the ore with numerous channels through which the water can flow away with ease.

If the mixing be performed in accordance with the invention, the freeing of the slimes from water to the extent hitherto practised when preparing the slimes with subsequent drying, is no longer necessary, for they can be transferred direct to the blast-roasting apparatus while still containing the amount of water left after the mechanical draining.

The fuel produces a threefold effect, namely:—

1. It dispenses with drying prior to sintering, the drying being effected by the fuel during the sintering process.
2. It facilitates the passage of air in the sintering process.
3. It effects the sintering itself by the fuel not consumed for the drying.

In the hereindescribed process moreover, the mixing of the ore and fuel proceeds far more easily and intimately than in the existing processes, in which the mixing was performed in special mixers, after a previous drying. In the mixing operation, which is effected in the aqueous suspension of the slimes, for example by stirring, the consumption of power is reduced to a minimum.

Finally, owing to the thorough and intimate mixing obtained by this method of operating, the sintering effect is also substantially better than with the existing process.

Of course, other materials producing a loosening effect, such as agglomerate, lump ore, or the like can be incorporated, in addition to the fuel, during or before the draining.

I claim:—

1. A method of preparing metallurgical slimes for a blowing process which comprises mixing the slime with solid fuel and other coarse materials such as agglomerate, coarse ore and the like favouring the escape of water and draining the mixture.

2. A method of preparing metallurgical slimes for a blowing process which comprises mixing the slime with solid fuel and other coarse materials such as agglomerate, coarse ore and the like favouring the escape of water while draining the mixture.

3. In a process for blast roasting metallurgical slimes, the steps which comprise mixing the slime with solid fuel and other coarse materials such as agglomerate, coarse ore and the like favouring the escape of water, draining the mixture and transferring the drained mixture direct to the blast roasting process while still containing the amount of water left after said draining.

4. In a process for blast roasting metallurgical slimes, the steps which comprise mixing the slime with solid fuel and other coarse materials such as agglomerate, coarse ore and the like favouring the escape of water, while draining the mixture and transferring the drained mixture direct to the blast roasting process while still containing the amount of water left after said draining.

In testimony whereof, I affix my signature.

HANS LEHRECKE.